(No Model.)
J. J. MAHER.
HAND IMPLEMENT FOR TAKING DOWN BUILDING STAGINGS.
No. 493,632. Patented Mar. 21, 1893.
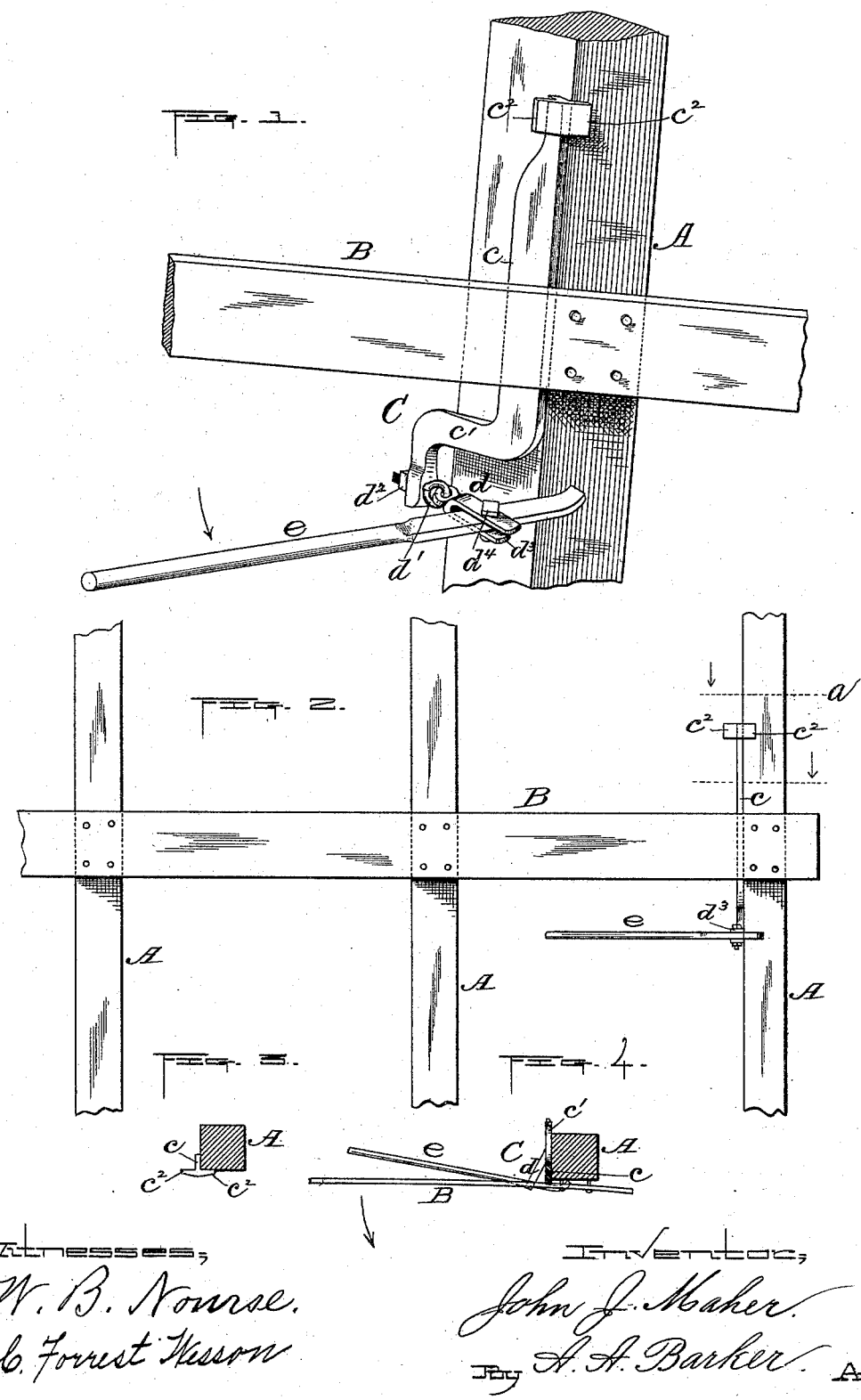

UNITED STATES PATENT OFFICE.

JOHN J. MAHER, OF WORCESTER, MASSACHUSETTS, ASSIGNOR OF ONE-HALF TO GEORGE D. WEBB, OF SAME PLACE.

HAND IMPLEMENT FOR TAKING DOWN BUILDING-STAGINGS.

SPECIFICATION forming part of Letters Patent No. 493,632, dated March 21, 1893.

Application filed December 15, 1892. Serial No. 455,287. (No model.)

*To all whom it may concern:*

Be it known that I, JOHN J. MAHER, of the city and county of Worcester and State of Massachusetts, have invented certain new and useful Improvements in Hand Implements for Taking Down Building-Stagings; and I do hereby declare that the following is a full, clear, and exact description thereof, reference being had to the accompanying drawings, forming a part of this specification, and in which—

Figure 1 represents a perspective view of my improved hand implement in position against a staging post and ledger board, preparatory to forcing off said board, as will be hereinafter explained. Fig. 2 represents a front view upon a smaller scale, of a series of staging posts with a ledger-board attached thereto, and said hand implement in a similar position to that shown in Fig. 1. Fig. 3 is a transverse or horizontal section through one of the staging posts, taken on line $a$ in Fig. 2, showing a plan of the upper end of the implement applied to said post, and Fig. 4 is a similar transverse section through said post and the upper part of the implement, showing the lower portions of said implement in plan view, the lever thereof being partly swung around from its normal position, and the ledger-board partly forced off thereby.

The object of my invention is to provide a hand implement or device whereby the ledger-boards of stagings may be forced off and said stagings thereby taken down in an easier and more expeditious manner than heretofore.

It consists of a bar adapted to lie against the side of the staging post, with its front face or edge against the back of the ledger-board, and having a suitable lateral flange or projection at its upper end, adapted to lap onto the face of the post, to obtain a bearing thereon when fitted in position, and of a lever loosely pivoted to the opposite end of said bar, by means of a swivel or other suitable pivot-bearing connected at one end with the bar, and at its other end with the lever; whereby, when the bearing point of said lever is placed against the face of the post, and its operating handle is swung forward to obtain a purchase thereon, the bar is also pulled forward to force off the ledger-board.

In order that others skilled in the art to which my invention appertains may better understand the nature and purpose thereof, I will now proceed to describe it more in detail.

In the drawings, the parts marked A represent the staging posts; B one of the ledger-boards attached thereto, as in an ordinary building staging; and C is my improved hand implement or device for forcing off said boards in taking down the staging. Said hand implement is constructed and operated to accomplish the above result, as follows:—

The bar $c$, previously alluded to, is preferably made of rectangular shape in cross-section, and is of irregular form longitudinally, being provided at its inner end with a rearwardly projecting arm $c'$ to which a swivel bearing $d$ is attached. In this instance, said swivel-bearing consists of a ring-bolt $d'$ passed through an opening in the end of the arm, and having a nut $d^2$ thereon, to hold it in place; and of a slotted piece $d^3$, having a ring at one end, which is linked into the ring of the bolt $d'$, and at its other end a transverse opening or slot in which is fitted the inner end of the hand-lever $e$, being held therein by the pivot-bolt $d^4$ passed transversely through said parts. Any other suitable swivel-bearing $d$, may be employed in lieu of the one above described, if preferred. The inner end of the hand lever is preferably flattened, as is shown in Fig. 1, to stiffen or strengthen the same, and also to fit the opening in the slotted piece $d^3$, and the extremity of said inner end is also preferably pointed to insure said end from slipping on the surface of the post in operating the device. Upon the outer extremity of the bar $c$ are formed laterally projecting flanges $c^2$ $c^2$, adapted to lap onto the face of the post when said bar lies against the side thereof, as is shown in Fig. 1, and whereby said end is held against the power exerted by the operation of the lever $e$, in forcing off the board from said post.

In operating the device to take down a staging, it is first applied to one side of the post with the flanges $c^2$ above the ledger-board, and the flange which comes next to said post overlapping its front edge, and also with the front edge of the bar $c$ against the back of said ledger-board. The operator then adjusts the pointed end of the hand-lever against the face of the post, below the ledger-board with the handle swung back at an angle to the face of the line of posts. Being thus adjusted or fitted in position, he now draws forward upon the handle of the lever, in the direction indicated by the arrows in Figs. 1 and 4, with sufficient force to extract the nails or other fastenings from the post by which the board is attached thereto, and thereby releases said board from the post; the same operation being repeated at each point where the ledger-boards are fastened to the posts, until the whole staging is taken down.

The device, it will be understood, may be applied to either side of a post as occasion may require, in taking down a staging, by swinging the hand-lever around to one side or the other, according to which side of the post the device is to be applied, the same being pivoted to a swivel-bearing, and the bar $c$, provided with a double flange at its outer end, as previously described, for this purpose.

It will at once be apparent that an ordinary building staging may be taken down by the use of my device, not only in a very easy, but in an expeditious manner. One man may thus accomplish the work of several in a given time, over the old way of driving off the boards by the use of a hammer or similar tool.

Having now described my invention, what I claim therein as new, and desire to secure by Letters Patent, is—

An improved hand implement or device for taking down building stagings, comprising in combination the angle-bar C, adapted to fit against the side of a staging-post, and having lateral flanges at its outer end adapted to lap onto the face of said post; the swivel-bearing $d$ attached to the inner end of said angle-bar, and the hand-lever $e$ pivoted near its inner end to said swivel-bearing, substantially as set forth.

JOHN J. MAHER.

Witnesses:
A. A. BARKER,
W. B. NOURSE.